US012781798B2

(12) United States Patent
Dal Zilio et al.

(10) Patent No.: US 12,781,798 B2
(45) Date of Patent: Nov. 3, 2026

(54) BEARING UNIT WITH RETAINING CAGE

(71) Applicants: AKTIEBOLAGET SKF, Gothenburg (SE); SKF Aerospace France S.A.S, Perrigny (FR)

(72) Inventors: Federico Dal Zilio, None (IT); Alexander Mocnik, Steyr (AT); Salvatore Cerasuolo, Pinerolo (IT); Valentin Roger Claude Fleury, Romans-sur-Isère (FR)

(73) Assignees: AKTIEBOLAGET SKF, Perrigny (FR); SKF Aerospace France S.A.S, Gothenburg (SE)

( * ) Notice: Subject to any disclaimer, the term of this patent is extended or adjusted under 35 U.S.C. 154(b) by 0 days.

(21) Appl. No.: 19/062,220

(22) Filed: Feb. 25, 2025

(65) Prior Publication Data

US 2025/0283509 A1 Sep. 11, 2025

(30) Foreign Application Priority Data

Mar. 8, 2024 (IT) ........................ 102024000005254

(51) Int. Cl.
*F16C 33/38* (2006.01)
*F16C 19/16* (2006.01)
*F16C 33/66* (2006.01)

(52) U.S. Cl.
CPC ........ *F16C 33/3806* (2013.01); *F16C 19/163* (2013.01); *F16C 33/3856* (2013.01); (Continued)

(58) Field of Classification Search
CPC ............... F16C 19/163; F16C 33/3806; F16C 33/3843; F16C 33/3856; F16C 33/6614; (Continued)

(56) References Cited

U.S. PATENT DOCUMENTS

| | | | |
|---|---|---|---|
| 4,572,678 | A | 2/1986 | Neder et al. |
| 2006/0008192 | A1 | 1/2006 | Sekimoto et al. |

(Continued)

FOREIGN PATENT DOCUMENTS

| | | | |
|---|---|---|---|
| CN | 201034119 | Y | 3/2008 |
| CN | 101280807 | A | 10/2008 |

(Continued)

OTHER PUBLICATIONS

Written Opinion and Search Report from the Italian Patent Office mailed Oct. 16, 2024 in related application No. IT 102024000005254, and translation thereof.

*Primary Examiner* — Phillip A Johnson
(74) *Attorney, Agent, or Firm* — J-TEK LAW PLLC; Scott T. Wakeman; Mark A. Ussai

(57) ABSTRACT

A bearing unit has a central rotation axis and includes radially inner and outer rings and a one-piece retaining cage having pockets bounded by cage rings and separated by bridges. A plurality of radially outwardly extending protuberances are arranged in a first row and a second row axially spaced from and parallel to the first row on a radially outer surface of the first cage ring and in a third row and a fourth row axially spaced from and parallel to the third row on a radially outer surface of the second cage ring. The protuberances of each first row are circumferentially spaced. The protuberances of the first row are circumferentially offset from the protuberances of the second row, and the protuberances of the third row are circumferentially offset from the protuberances of the fourth row.

8 Claims, 3 Drawing Sheets

(52) U.S. Cl.
CPC ...... *F16C 33/6614* (2013.01); *F16C 33/6629* (2013.01); *F16C 2208/02* (2013.01); *F16C 2208/90* (2013.01); *F16C 2212/00* (2013.01); *F16C 2220/24* (2013.01); *F16C 2300/22* (2013.01); *F16C 2322/39* (2013.01)

(58) Field of Classification Search
CPC .............. F16C 33/6629; F16C 2208/02; F16C 2208/90; F16C 2212/00; F16C 2220/24; F16C 2300/22; F16C 2322/39; B33Y 80/00
See application file for complete search history.

(56) References Cited

U.S. PATENT DOCUMENTS

| | | | | |
|---|---|---|---|---|
| 2011/0170818 | A1 | 7/2011 | Yamamoto et al. | |
| 2012/0211470 | A1 | 8/2012 | Webster et al. | |
| 2017/0191528 | A1 | 7/2017 | Inoue et al. | |
| 2018/0172075 | A1 | 6/2018 | Sugita et al. | |
| 2019/0249717 | A1 * | 8/2019 | Sugita | F16C 33/6614 |
| 2021/0048068 | A1 | 2/2021 | Niedermeier | |

FOREIGN PATENT DOCUMENTS

| | | | | | |
|---|---|---|---|---|---|
| CN | 103267065 | A | | 8/2013 | |
| DE | 102013225339 | A1 | * | 6/2015 | F16C 33/56 |
| DE | 102016200348 | A1 | * | 7/2017 | F16C 33/3856 |
| DE | 102019213988 | A1 | | 3/2021 | |
| EP | 3746668 | B1 | | 8/2023 | |
| FR | 2515755 | A1 | | 5/1983 | |
| FR | 2920499 | A1 | | 3/2009 | |
| FR | 3131944 | A1 | | 7/2023 | |
| GB | 2551434 | A | * | 12/2017 | F16C 33/4623 |
| JP | 2015148241 | A | | 8/2015 | |
| KR | 20170102526 | A | | 9/2017 | |
| KR | 20180075744 | A | | 7/2018 | |
| SU | 1636610 | A1 | * | 3/1991 | F16C 33/3843 |
| WO | 2018186346 | A1 | | 10/2018 | |

* cited by examiner

BEARING UNIT WITH RETAINING CAGE

CROSS-REFERENCE

This application claims priority to Italian patent application no. 10 2024000005254 filed on Mar. 8, 2024, the contents of which are fully incorporated herein by reference.

TECHNOLOGICAL FIELD

The present disclosure relates to a bearing unit with a retaining cage. In particular, the bearing unit is an angular-contact bearing unit for applications requiring high precision, for example machine tools.

BACKGROUND

Known bearing units with a retaining cage include a radially outer ring, a radially inner ring, a plurality of rolling bodies, in particular balls, interposed between the inner ring and the outer ring to enable the relative rotation thereof, and a retaining cage that holds the balls in respective circumferential positions.

The retaining cage of a known type comprises a one-piece annular body that defines a reference axis, the body of the cage delimiting substantially cylindrical cavities or pockets distributed about the reference axis. The balls are housed in these cavities, which define the positioning and holding of the balls.

These retaining cages are usually used in high-velocity, high-vibration bearing units, in particular for applications in the industrial sector, for example in machine tool spindles, and are typically made by injection molding a polymer material, including to compensate for poor lubrication conditions. As the bearing unit requires a high degree of precision, the cages for these applications must also meet this accuracy requirement. Therefore, the cages are finished with machine tools and must therefore have a very simple geometry.

One drawback of this type of retaining cage is the frictional losses between the outer surface of the cage and the inner surface of the outer ring of the bearing unit on which the cage is centered.

SUMMARY

An aspect of the present disclosure is to provide a bearing unit with a retaining cage that does not have the drawback described above.

Another aspect of the disclosure is a bearing unit having a central rotation axis and that comprises a radially outer ring, a radially inner ring, and a retaining cage configured to retain rolling bodies between the radially outer ring and the radially inner ring. The retaining cage includes a one-piece annular body having a first cage ring connected to a second cage ring by a plurality of bridges, and a plurality of pockets configured to house and retain respective rolling bodies, each of the pockets being separated by pairs of the bridges and framed by the first cage ring and the second cage ring. A plurality of radially outwardly extending protuberances are arranged in a first row and a second row axially spaced from and parallel to the first row on a radially outer surface of the first cage ring and in a third row and a fourth row axially spaced from and parallel to the third row on a radially outer surface of the second cage ring. The protuberances of the first row are circumferentially spaced and the protuberances of the second row are circumferentially spaced and the protuberances of the third row are circumferentially spaced and the protuberances of the fourth row are circumferentially spaced. Furthermore, the protuberances of the first row are circumferentially offset from the protuberances of the second row, and the protuberances of the third row are circumferentially offset from the protuberances of the fourth row.

BRIEF DESCRIPTION OF THE DRAWINGS

The invention is described below with reference to the attached drawings, which show non-limiting example embodiments thereof, in which.

DETAILED DESCRIPTION

Figure 1:
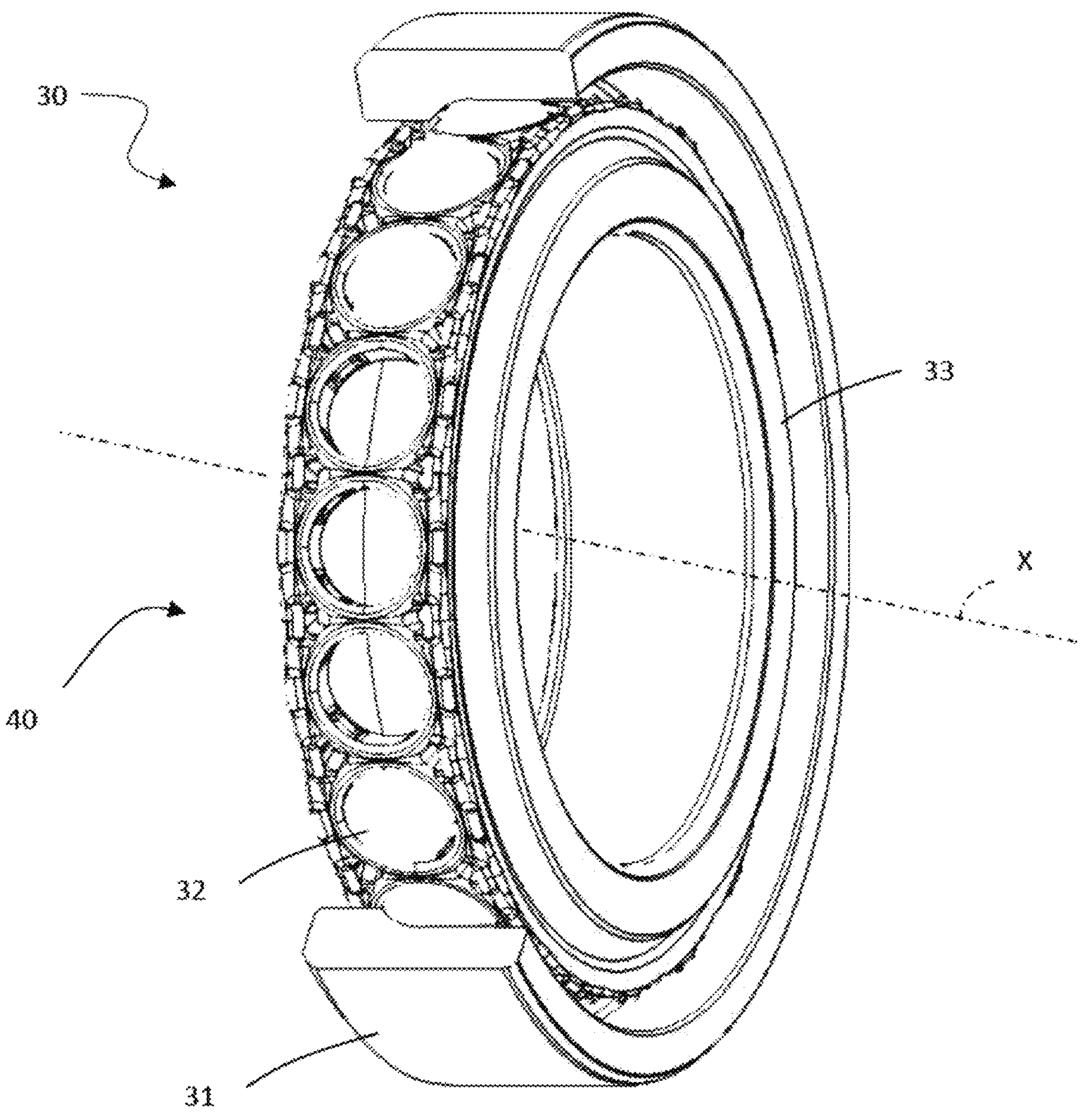
FIG. 1 is an axonometric view of a bearing unit according to a first preferred embodiment of the disclosure.

In FIG. 1, reference sign 30 denotes a bearing unit as a whole, according to a preferred embodiment of the disclosure. The bearing unit 30 has a central rotation axis X and includes a stationary radially outer ring 31, a rotary radially inner ring 33, a row of rolling bodies 32, in particular balls, interposed between the radially outer ring 31 and the radially inner ring 33, and a cage 40 that holds the rolling bodies 32 in place, the cage being centered on the radially outer ring 31.

Throughout the present description and in the claims, terms and expressions indicating positions and orientations, such as "radial" and "axial", are to be understood with reference to the central rotation axis X of the bearing unit 30, unless otherwise specified. For the sake of simplicity, the term "ball" may be used by way of example in the present description and in the attached drawings instead of the more generic term "rolling body", and the same reference signs shall be used.

Figure 2:
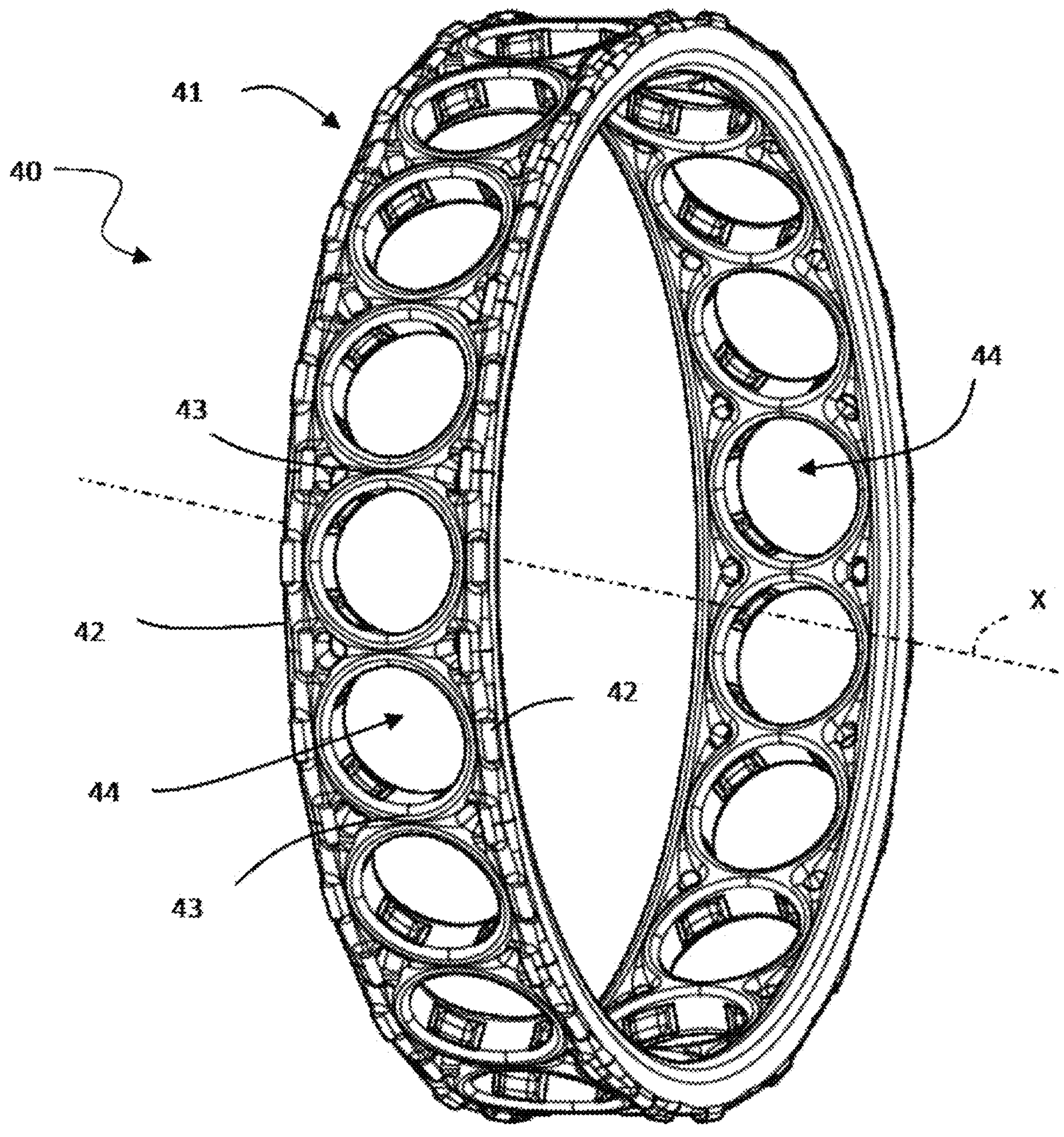
FIG. 2 is an axonometric view of a retaining cage of the bearing unit of FIG. 1.
Figure 3:
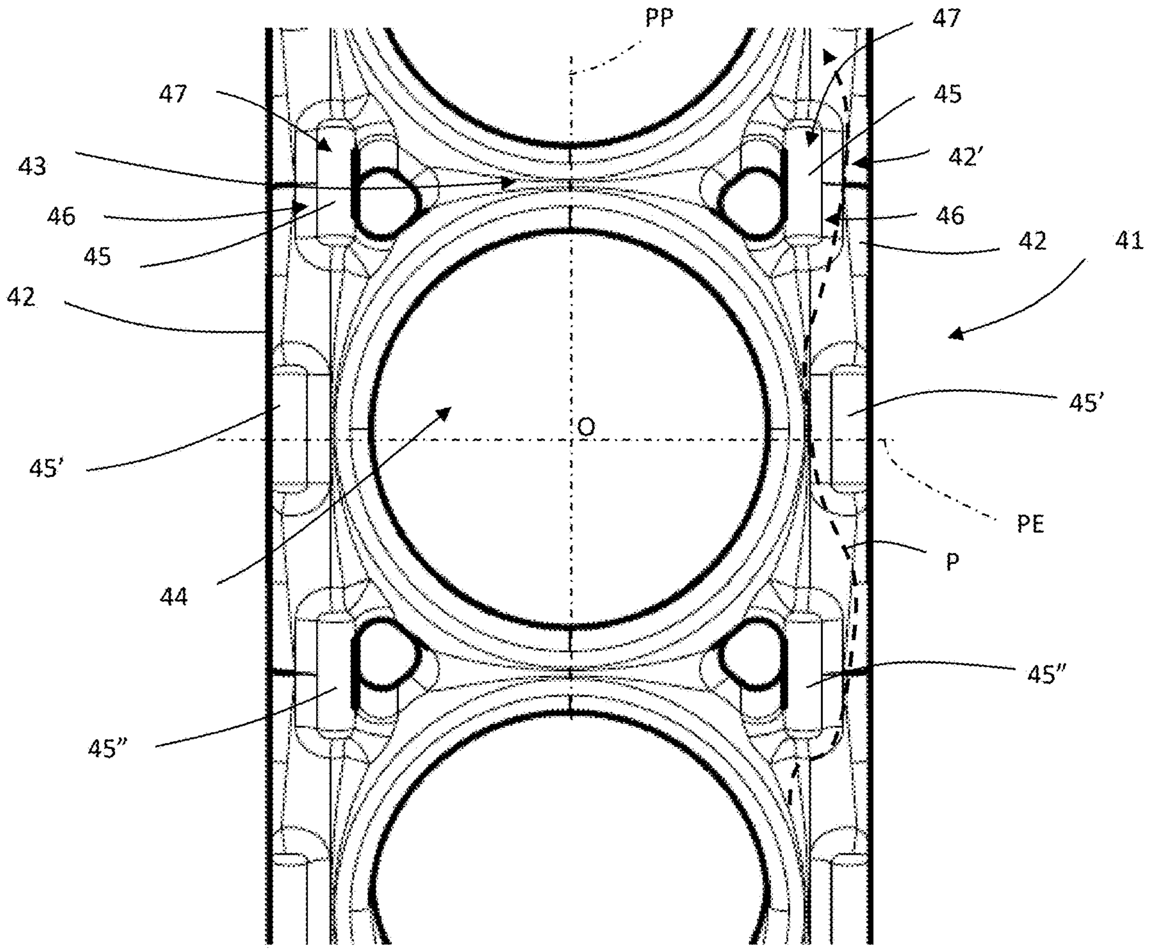
FIG. 3 is a detail view of a first portion of the retaining cage of FIG. 2.

With reference to FIGS. 2 and 3, the cage 40 according to the present disclosure has an annular shape defining a main axis of inertia or reference axis, which is coincident with the central rotation axis X of the bearing unit 30. The retaining cage 40 has a one-piece annular body 41 that forms two rings 42, one ring for each axial end, connected by bridges 43. The annular body 41 of the cage 40 can be made of any suitable material, in particular any material suitable for additive manufacturing, for example plastic, ceramic or metal material. An example of a material preferably used is a composite material based on cotton fibers impregnated with a phenolic resin.

The two rings 42 and the bridges 43 delimit a plurality of through-cavities 44 or pockets separated by pairs of the bridges 43 and each framed by the two rings 42. An outer surface 42' of the ring 42 delimits the boundary of the cavity with respect to the two rings 42 and the pair of bridges 43. The cavities 44 house respective rolling bodies 32, in particular balls, in order to position and hold the rolling bodies.

Each cavity 44 has a polar plane PP and an equatorial plane PE, both perpendicular to the annular body 41. Each cavity 44 has a center O at the intersection of these two planes. The centers O of the cavities are all located at an equal distance from the central rotation axis X.

An aspect of the present disclosure is to optimize the topology of the cage 40, in particular a cage for a super-precision angular-contact bearing unit able to operate optimally at high speed (with a NDm speed factor of approximately 3 million).

In particular, the disclosure aims to optimize the centering between the cage 40 and the radially outer ring 31, such centering being very important in high-speed and high-vibration angular-contact bearing units as it ensures the stability of the cage (and therefore of the rolling bodies) at high rotational speeds. More precisely, centering is defined by a pre-determined nominal clearance between the radially outer cylindrical surface of the annular body 41 of the cage and the radially inner surface of the outer ring, the motion of the cage in relation to the outer ring therefore being orbital. This means that the actual contact surface between the cage and the outer ring is a rather large portion of the cage nonetheless limited to about ⅓ of the axial width of the cage, since the orbital motion causes contact to act only on one axial end, i.e. on one ring 42 of the annular body 41 of the cage 40.

The solution provided by the present invention significantly reduces this contact surface with the outer ring. This is evidently intended to reduce the friction generated by the contact between the cage and the outer ring and, as further explained below, to facilitate the flow of lubricating grease using dedicated paths. According to the invention, the two rings 42 of the annular body 41 are provided with a plurality of protuberances 45 that project radially outwards, are discontinuous in relation to one another, are arranged circumferentially in two parallel rows, and are staggered in relation to one another. Each ring 42 therefore has first protuberances 45' arranged in an axially outer first circumferential row, and second protuberances 45" arranged in a respective axially inner second circumferential row. The protuberances 45 therefore ensure that the cage 40 is centered on the radially outer ring 31.

Each protuberance 45 has lateral surfaces 46 connecting to the respective ring 42 of the annular body 41 and a radially outer hemi-cylindrical surface 47. The set of hemi-cylindrical surfaces 47 is intended to come into contact with the stationary outer ring 31 during the motion of the bearing unit to center and guide the cage 40. This plurality of hemi-cylindrical surfaces 47 represents only a part of the inner cylindrical centering surface in the prior art, and therefore the overall contact surface of this cage 40 is reduced, thereby reducing friction losses due to contact between the cage and the outer ring. All of the protuberances 45, i.e. all of the hemi-cylindrical surfaces 47, help to center the cage, naturally not by touching the outer ring simultaneously, but periodically depending on the orbital motion of the cage.

There are exactly twice as many protuberances 45 as through-cavities 44 along the entire circumference of a ring 42 of the annular body 41, and there are therefore four times as many protuberances 45 as cavities 44 along the entire circumference of the whole annular body 41. For example, a typical cage for use in an angular-contact bearing unit is provided with 19 through-cavities 44, and therefore has 38 protuberances 45 for each ring 42.

Figure 4:
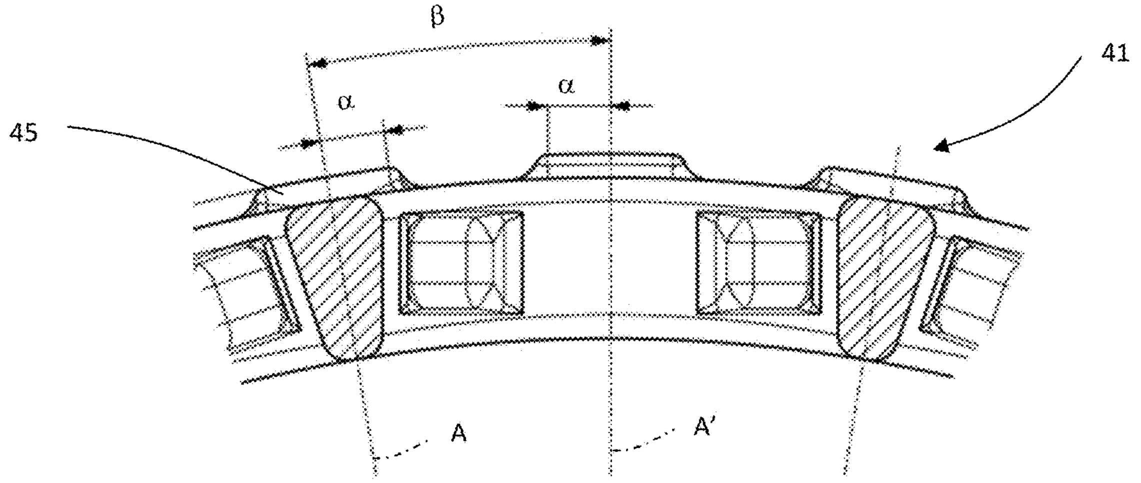
FIG. 4 is a detail view of a second portion of the retaining cage of FIG. 2.

Also with reference to FIG. 4, the protuberances 45 advantageously have an angular extension 2*a* with respect to the central rotation axis X of the cage 40 and of the bearing unit 30, of between 4° and 5°, for example 4.6°. The protuberances 45 are equidistant in the circumferential direction. The angular distance β between the respective median planes A, A' of two angularly consecutive protuberances is preferably between 9° and 10°, for example 9.5°.

In total, the 38 protuberances 45, which make up the two rows of each ring 42, cover an angular extension of 174.8°, this angular extension covered by the protuberances representing 48.6% of the 360° of the entire circumference. In other words, according to the disclosure, the contact surface between the cage and the ring is reduced to just under half compared to known solutions. In fact, the advantage in terms of reducing the contact surface is even greater, since, according to the disclosure, contact occurs via the hemi-cylindrical surfaces 47, which make linear contact instead of surface contact.

In addition, this particular geometry defines a path P for the lubricating grease defined between the radially outer surfaces 42' of the rings 42, not in contact with the radially outer ring 31, and the lateral surfaces 46 connecting to the respective ring 42 of the protuberances 45. This tortuous path facilitates the flow and/or redistribution of the lubricating grease in all of the contact areas between the cage and the outer ring.

This improved performance of the cage is due to the optimization of the topology of the cage, which is a process that combines design tools and FEM calculations and enables highly customized shapes to be realized. The principle of topology optimization has been applied to a cage for super-precision angular-contact ball bearings, assuming that the component is manufactured using additive manufacturing techniques. This enables all possible complex geometries resulting from the optimized topology design to be realized.

Thus, although the disclosure is applicable to any method of manufacturing the bearing unit cage, given the particular geometry of the cage, as described above, the aforementioned invention is particularly suitable for a cage of a bearing unit in which the body is obtained by additive manufacturing.

Ultimately, the present disclosure provides many advantages. A first advantage is that the entire cage can be obtained using a known injection molding process or, preferably, using other processes such as additive manufacturing. Another advantage is a reduction of the actual region in which there is contact between the cage and the outer ring. This mainly means reducing friction between the two components. A further advantage is improved flow/redistribution of the lubricating grease during the movement of the cage along the path created between the surfaces of the cage not in contact with the outer ring.

Numerous other variants exist in addition to the embodiments of the invention described above. The embodiments are provided solely by way of example and do not limit the scope of the invention, its applications or its possible configurations. Indeed, although the description provided above enables the person skilled in the art to carry out the present invention at least according to one example configuration thereof, numerous variations of the components described could be used without thereby departing from the scope of the invention, as defined in the attached claims interpreted literally and/or according to their legal equivalents.

What is claimed is:

1. A bearing unit having a central rotation axis and comprising:

a radially outer ring, a radially inner ring, a retaining cage configured to retain rolling bodies between the radially outer ring and the radially inner ring, the retaining cage comprising:

a one-piece annular body having a first cage ring connected to a second cage ring by a plurality of bridges, a plurality of pockets configured to house and retain respective rolling bodies, each of the pockets being separated by pairs of the bridges and framed by the first cage ring and the second cage ring, and a plurality of radially outwardly extending protuberances arranged in a first row and a second row axially spaced from and parallel to the first row on a radially outer surface of the first cage ring and in a third row and a fourth row axially spaced from and parallel to the third row on a radially outer surface of the second cage ring, wherein the protuberances of the first row are circumferentially spaced and the protuberances of the second row are circumferentially spaced and the protuberances of the third row are circumferentially spaced and the protuberances of the fourth row are circumferentially spaced, and wherein the protuberances of the first row are circumferentially offset from the protuberances of the second row and the protuberances of the third row are circumferentially offset from the protuberances of the fourth row.

2. The bearing unit according to claim 1, wherein each protuberance of the first and second rows has a first lateral surface and a second lateral surface extending from the radially outer surface of the first cage ring and a hemi-cylindrical surface extending from the first lateral surface to the second lateral surface.

3. The bearing unit according to claim 2, wherein, a circumference of the first cage has exactly twice as many protuberances as pockets.

4. The bearing unit according to claim 2, wherein each protuberance of the first and second rows has an angular extent relative to the central rotation axis of the bearing unit of between 4° and 5°.

5. The bearing unit according to claim 4, wherein circumferential center points of adjacent protuberances of the first row of protuberances are spaced by 9° to 10°.

6. The bearing unit according to claim 2, wherein a tortuous lubricant path is defined between the radially outer surface of the first cage ring and the lateral surfaces of the protuberances of the first cage ring.

7. The bearing unit according to claim 2, wherein the annular body of the cage is formed by an additive manufacturing process.

8. The bearing unit according to claim 1, wherein the annular body is formed from cotton fibers impregnated with a phenolic resin.

* * * * *